United States Patent [19]

Langley et al.

[11] 4,293,513

[45] Oct. 6, 1981

[54] METHOD OF MAKING HONEYCOMB STRUCTURES

[75] Inventors: Robert C. Langley, Millington; Herbert Myers, Newark; Muriel Abrash, Paterson, all of N.J.

[73] Assignee: Engelhard Minerals & Chemicals Corporation, Edison, N.J.

[21] Appl. No.: 576,640

[22] Filed: May 12, 1975

Related U.S. Application Data

[63] Continuation of Ser. No. 344,510, Mar. 26, 1973, abandoned, which is a continuation-in-part of Ser. No. 86,127, Nov. 2, 1970, abandoned.

[51] Int. Cl.³ .............................................. C04B 35/64
[52] U.S. Cl. ....................................... 264/60; 264/132; 264/173; 264/308
[58] Field of Search ..................... 264/60, 61, 62, 132, 264/308, 173; 101/129

[56] References Cited

U.S. PATENT DOCUMENTS

| | | | |
|---|---|---|---|
| 2,872,326 | 2/1959 | Morris | 106/19 |
| 3,092,504 | 6/1963 | Langley et al. | 101/129 |
| 3,432,328 | 3/1969 | Vaurio | 101/129 |
| 3,549,784 | 12/1970 | Hargis | 174/68.5 |

FOREIGN PATENT DOCUMENTS 768623  2/1957  United Kingdom ................ 101/129

OTHER PUBLICATIONS

Hughes, *Screen Printing of Microcircuits*, pp. 30-35, (1967).

*Primary Examiner*—John Parrish
*Attorney, Agent, or Firm*—Inez L. Moselle

[57] ABSTRACT

Monolithic honeycomb structures are made by heating to a fluid condition an admixture comprising an inorganic powder and a temporary vehicle, forcing the fluid admixture through a stencil having a plurality of masking islands thereby forming a thin lamina beneath the stencil which is cooled immediately to form an essentially solid structure. This process is repeated to form a composite of successive cohered laminae thereby forming a monolithic honeycomb structure, which is heated to remove the vehicle and subsequently sintered to form a self-supporting honeycomb structure.

10 Claims, 8 Drawing Figures

U.S. Patent  Oct. 6, 1981  Sheet 1 of 2  4,293,513
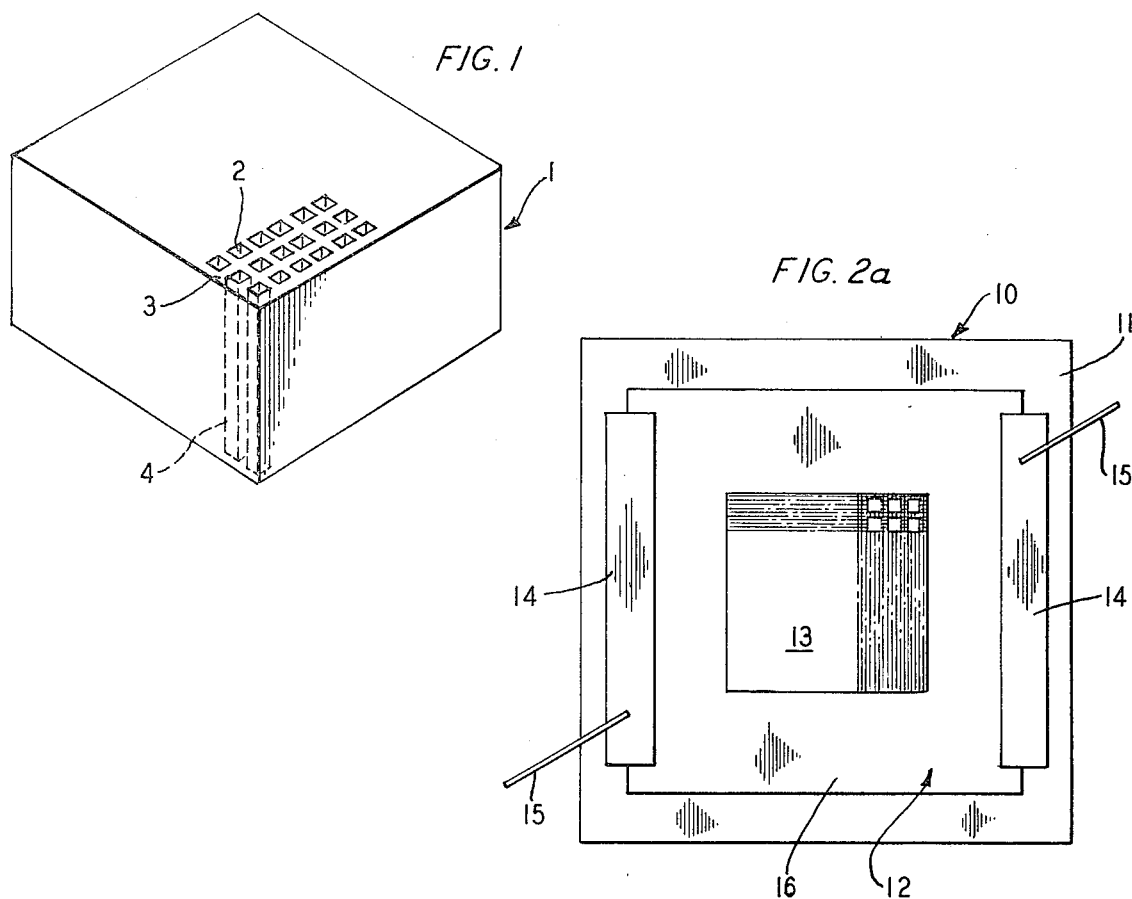
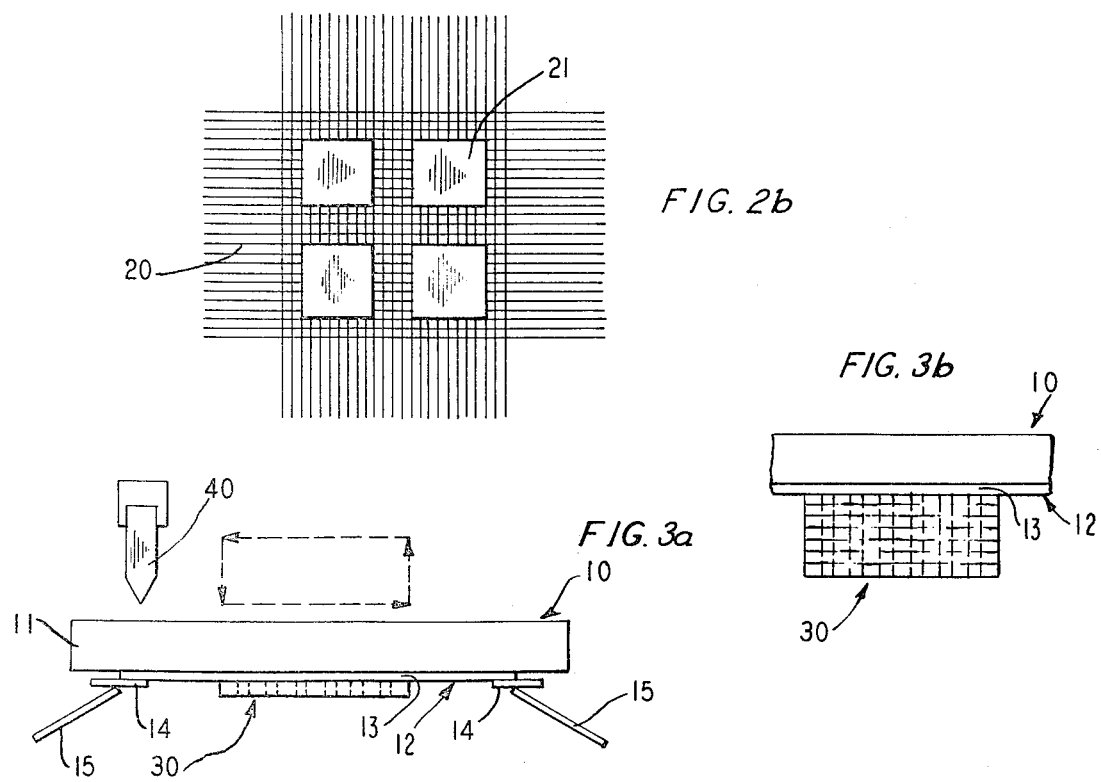

METHOD OF MAKING HONEYCOMB STRUCTURES

This is a continuation of application Ser. No. 344,510, filed Mar. 26, 1973 abandoned, which is a continuation-in-part of our Langley et al. application, Ser. No. 86,127, filed on Nov. 2, 1970, abandoned.

This invention releates to unique monolithic honeycomb structures and to a method for their manufacture. In a more specific aspect, this invention relates to refractory honeycomb structures and to a method for their manufacture.

Honeycomb structures are utilized in many fields, e.g., as catalysts, catalyst supports, heat exchangers, scrubbers, demisters, packing materials, and structural supports such as for mirrors in large telescopes. U.S. Pat. No. 3,502,596, issued Mar. 24, 1970, summarizes the two principally used processes for manufacturing ceramic honeycomb structures. In one process, a mixture of a ceramic powder and binding agent is applied to each side of a flexible carrier, and the composite is then corrugated and formed into a honeycomb. The shaped body is heated to burn-off the binder and sinter the ceramic. The carrier may be an organic material which decomposes during the sintering step, or a thin metal carrier which is removed while the corrugated body is in the green state. In the other type of process, a metal sheet such as aluminum foil is fabricated in a honeycomb shape, coated with a fluxing agent, and then fired to oxidize the aluminum to alpha-alumina. The fluxing agent may be coated on the foil before it is fabricated into the honeycomb shape. Both of these processes have been used commercially for several years to produce ceramic honeycomb structures. However, the methods are expensive, and in both processes it is difficult to modify the cross-sectional shapes of the honeycomb channels.

Manufacturing honeycomb structures by extrusion is far from satisfactory. High pressure is used in extrusion which is difficult to equalize across the die, and the unequalized pressure results in a distorted extruded body. British Pat. No. 1,142,800 discloses an extrusion process, but it would be extremely difficult to make by this procedure honeycomb structures having a great many openings, for example, 200 to 300 channels per square inch of cross-section.

This invention has, therefore, as its purpose to provide unique monolithic honeycomb structures and a method for the manufacture of such structures which overcomes the disadvantages of the prior art. The invention is explained below with reference to ceramic honeycombs including specific illustrations thereof, but it is within the spirit and scope of this invention to include a wide variety of materials and configurations.

In the manufacture of honeycomb structures according to our invention, a mixture containing a refractory, inorganic powder and a temporary vehicle is forced at elevated temperature through a foraminous stencil or screen having a plurality of masking islands thereby forming a thin lamina beneath the stencil. The porous areas of the stencil and the resulting lamina define the cross-sectional configuration and the masking islands define openings in the lamina. As a result of being forced under pressure through the stencil, the mixture is formed into the desired pattern as a lamina on the opposite or exit side of the stencil and is cooled and hardened to a substantially self-supporting structure. The lamina is cooled more or less immediately after the mixture emerges from the stencil by loss of heat to the ambient surroundings. This procedure is repeated many times and as each lamina is formed beneath the stencil, the lamina overlays the previously deposited lamina and the successive laminae formed are thus in continuous cohesive contact. The number of times the lamina-forming procedure is repeated determines the depth or length of the resulting three-dimensional structure produced. The resulting green structure is heated to remove the temporary vehicle, and thereafter sintered to provide a self-supporting honeycomb structure. In order to prevent distortion, it is preferable to heat the green structure under gradually increasing temperature conditions.

The monolithic structure formed by this invention is a composite of cohered, thin lamina of refractory, inorganic material disposed as a network of thin walls surrounding open spaces, preferably having average diameters exceeding the thickness of the walls. These laminae are cohered in sufficient numbers to form a given monolithic structure with continuous, longitudinal passageways or channels corresponding in cross-section to the masking islands of the stencil. Preferably, the channels are of uniform cross-sectional area and are symmetrically arranged. The monolithic structures of this invention can be generally referred to as being of the honeycomb-type, regardless of the cross-sectional shape of the channels in the structures.

In forming the products of this invention, the admixture of finely defined refractory, inorganic solids and temporary vehicle is placed in contact with the feed side of the stencil and the mixture has sufficient body, viscosity or consistency that it will not pass through the porous areas of the stencil merely due to the force of gravity of say an 0.5 inch layer of the mixture. Thus, the mixture is forced through the stencil under force or pressure. The admixture thus contains sufficient solids and vehicle to provide, when cooled substantially a self-supporting green structure on the exit side of the stencil, and the consistency of the mixture enables this to be accomplished to form a thin layer or lamina on the exit side of the stencil.

The inorganic powder and temporary vehicle are admixed to form substantially homogenous, essentially solid consistency mass at about room temperature such that they can be heated to moderately elevated temperatures, for instance, up to about 150° C., more preferably about 70°–125° C., so that the mixture is sufficiently fluid for it to be forced through the stencil. This extent of heating often serves to change the mixture from an essentially solid consistency to that of a paste-like mass, and the characteristics of the mixture are such that when the lamina emerge from the stencil and is cooled, an essentially solid self-supporting structure is formed. To provide the desired heating of the mixture, it is preferred that the stencil itself be heated, although the elevated temperature may be provided by heating the mixture prior to contact with the stencil or both of these types of heating may be employed at the same time. In any event, the heated mixture is forced through the stencil to form the lamina of desired cross-sectional pattern which is then cooled.

The lamina is essentially a reproduction of the stencil, and therefore the horizontal cross-section of the lamina can be varied by varying the configuration and design of the stencil. Thus, the stencil can be a screen having masking islands or non-porous areas corresponding to the shape of the channels to be formed in the monolithic structure, with the space between the islands defining the thin walls surrounding the open spaces of the monolithic structure. For instance, in making the honeycomb structure, the stencil can be provided with a plurality of masking islands which can be symmetrically-arranged and uniformly-spaced relative to each other as described hereinafter in greater detail. As the lamina exits the stencil, it is cooled by the loss of heat and forms a reproduction of the stencil with the masking islands defining openings in the layers. The process is repeated to cause successive cohesive laminae to form a substantially monolithic honeycomb structure having a plurality of symmetrically-arranged channels formed therethrough, the channels having open cross-sectional areas provided by the masking islands. The resulting green structure can be heated to remove the vehicle and this is preferably done under gradually increasing temperature conditions to prevent distortion of the self-supporting structure. The structure can then be sintered and permitted to cool to form a fired honeycomb structure.

It will be observed that the process of this invention constitutes a substantial modification of the hot melt printing process, which is an adaptation of silk screen printing. In the hot melt printing process, one to three layers of material are printed onto a substrate. The print is essentially two dimensional having perhaps a maximum thickness of up to about 40 mils. In one procedure, a solid substrate which typically is made of stainless steel, is coated with a photosensitive organic material which polymerizes upon exposure to light. A positive of the pattern is superimposed on the coated substrate and exposed to light. The unexposed areas which remain unpolymerized, are subsequently washed from the screen thereby defining the pattern. Alternatively, a stencil or screen can be a metal orifice plate, and placed on a substrate for the print. The hot melt print is then deposited on the screen and is printed onto the substrate through the screen.

In sharp contrast to the hot melt printing process, the method of this invention provides for the manufacture of a three-dimensional, monolithic structure which is held together primarily by the connecting solid portions of the pattern rather than by a supporting substrate. It will be observed that the planar dimensions or cross-sectional geometry of the structure is defined by the pattern of the stencil. Thus, in cross-section, the structure may be rectangular, square, diamond, circular, eliptical or any other shape, and likewise the cross-section of the channels may be varied depending upon the design of the masking islands. The depth or length of the monolithic structure is determined by the number of laminae, but to be of practical value, the length of the structure should be at least about 0.1 inch, more preferably, this depth should be at least one inch, but may be as much as about 12 inches or more. The thickness of a thin lamina formed on the exit side of the stencil may often be at least about 10 mils, say up to about 100 mils or more, preferably about 20 to 50 mils. For example, a monolithic honeycomb structure having a depth of one inch may comprise about 20 to 50 laminae. The number of laminae composited may vary depending largely upon the composition of the mixture. The minimum number of laminae composited to form the self-supporting structure is often at least about 20, preferably at least about 50. The desired geometry and dimensions of the structure usually depends on its ultimate use.

In order to describe the invention in greater detail, reference is now made to the accompanying drawings wherein like numerals designate similar parts throughout.

FIG. 1 is a perspective view of a monolithic honeycomb structure prepared by the method of this invention;

FIG. 2a is an elevational bottom view of a framed stencil;

FIG. 2b is an enlarged fragmentary plan view of the stencil of FIG. 2a showing in greater detail the masking islands;

FIG. 3a is a side view of FIG. 2a and shows a lamina of the honeycomb composition formed beneath the stencil, the dimensions thereof being greatly exaggerated for purposes of illustration;

FIG. 3b is a fragmentary view of FIG. 3a showing a more advanced step in the process where a number of lamina of the honeycomb composition are formed beneath the stencil, the dimensions thereof being greatly exaggerated for purposes of illustration;

Figure 4:
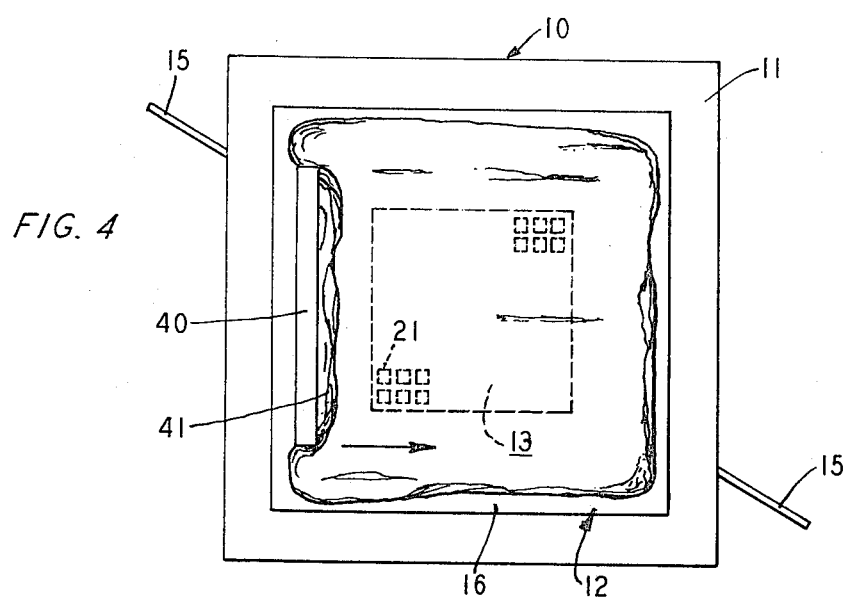
FIG. 4 is a plan view of the framed stencil and shows the fluidized composition on top of the stencil and the wiper in the starting position.

Referring to the drawings wherein like numerals refer to similar parts throughout, there is shown in FIG. 1 a monolithic honeycomb structure indicated generally by the numeral 1 and made by the process of this invention. The honeycomb structure includes the plurality of symmetrically-arranged, longitudinal channels 2, only some of which are indicated. Although the embodiment shown illustrates a channel having a substantially square shaped cross-section, this shape may be, for example, triangular, star, oval, circular, etc. In a typical honeycomb structure made by the process of this invention, there may be about 200 to 300 channels per square inch, each channel having a diameter or width of, for instance, about 40 mils. Generally, the structure will have at least about 50 or 100 of the channels per square inch of cross-section. Broken line 4 indicates the position of the longitudinal channels through the honeycomb structure. The thickness of wall 3 in such a structure may vary depending largely on the composition and end use of the honeycomb, but this thickness may be from about 1 to 50 mils, preferably about 2 to 30 mils, and is less than the average diameter or width of the channels, preferably less than about 25% of the average diameter or width of the channels.

There is shown in FIG. 2a a stencil indicated generally by the numeral 10 including wooden frame 11 and stainless steel screen 12. The screen is provided with a lacquer-coated area 16, and an art work area 13 which defines the planar geometry of the honeycomb structure. Copper sheets 14 are are fastened to the frame and contact the screen 12. Insulated conductors 15 connect the copper sheets to an electrical power supply (not shown) of, for instance, 100 amps and 12 volts. In this manner, electric current is passed through the stainless steel screen which functions as a heating element thereby maintaining the composition being forced therethrough at optimum temperatures. The electric current can be controlled closely by means of a powerstat, and, therefore, the temperature of the composition, which largely determines its viscosity, can be closely controlled.

FIG. 2b shows in greater detail the art work area 13 of FIG. 2a. The art work area comprises a grid of extremely fine stainless steel wires 20 and symmetrically-arranged, masking islands 21. Reciprocating squeegee 40, which may be formed of hard rubber, is passed over the art work area while assuming a travel path as shown by the broken line and arrows of FIG. 3a.

Figure 5:
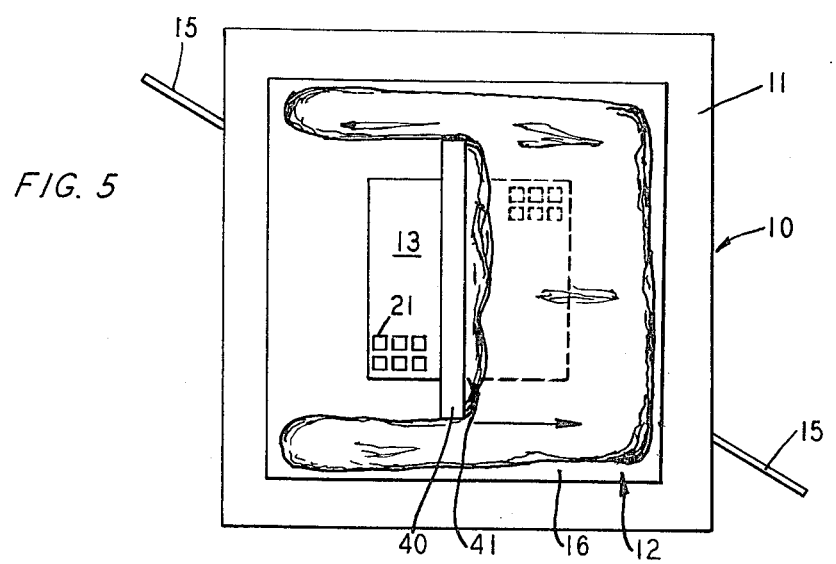
FIG. 5 is a plan view similar to FIG. 4 but shows the wiper part of the way through the wiping stroke.
Figure 6:
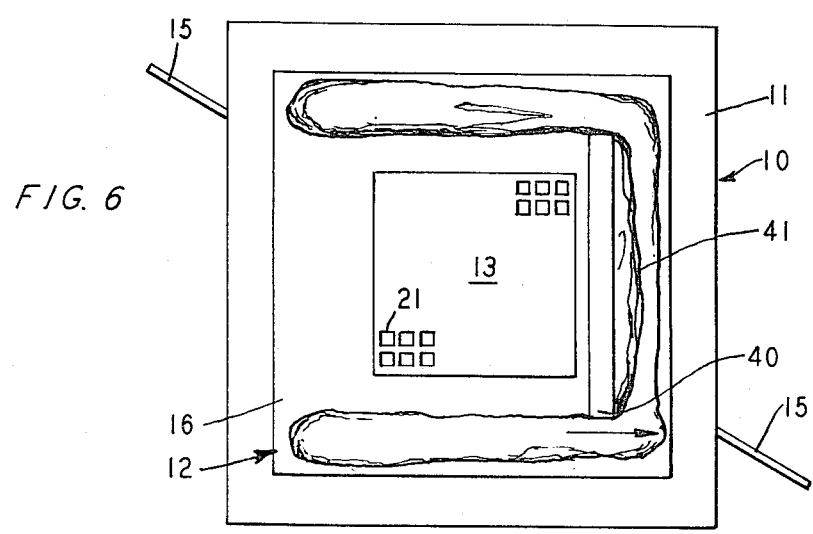
FIG. 6 is a plan view similar to FIGS. 4 and 5, but shows the wiper at the completion of the wiping stroke.

In order to illustrate the process, reference is now made in particular to FIGS. 4, 5 and 6. The composition 41 comprising refractory, inorganic powder and a temporary vehicle are deposited on the stencil. As explained above, the stencil is electrically heated, and, therefore, the composition is brought to a more fluid condition. The squeegee 40 is shown in FIG. 4 at the beginning of a wiping stroke across the art work area 13. In actual practice, the composition 41 may cover the entire stencil for a depth of about one-half inch. The temperature of the composition is controlled to raise its viscosity so as to exhibit a more fluid condition such that the composition, although fluidized or plasticized, will not flow through the perforations of the stencil by gravity alone.

In FIGS. 5 and 6, the squeegee is shown as being advanced to the middle and at the end, respectively, of the wiping stroke, thereby forcing the composition 41 through the stencil as illustrated diagrammatically in FIG. 3a. Squeegee 40 stops at the completion of a wiping stroke, lifts and returns to the starting position of FIG. 4. Due to the close contact of the squeegee with the surface of the stencil, the surface of the art work area 13 is more or less free of the inorganic powder-vehicle formulation at the end of a wiping stroke, and all open areas around islands 21 in the art work area have been forced-filled with a uniform amount of the formulation. The next wiping stroke forces out the formulation deposited in the screen during the preceding stroke. Mechanical means (not shown) deposit additional composition 41 onto the stencil when squeegee 40 is about to start a new wiping stroke.

When the composition is forced through the screen, lamina 30 is formed beneath art work area 13 of screen 12 as shown in FIG. 3a, and is immediately cooled by loss of heat to the ambient temperature surroundings. As shown in FIG. 3a, the upper face of lamina 30 is in contact with the base of art work area 13 of screen 12. Each masking island 21 forms an opening in the lamina, and therefore, when successive coatings of laminae are formed, a channel is provided within and longitudinally of the monolithic honeycomb structure. (See FIG. 3b.) Thus, in effect the process is incremental rather than continuous in that the structure is formed in layers. The masking islands are symmetrically-arranged on the stencil and substantially-uniformly spaced relative to each other. Hence, the monolithic honeycomb structure is comprised of symmetrically-arranged channels. As shown in FIG. 3b, the upper face of the last-formed layer is in contact with the exit side of heated screen 12 and the lower face of the last-formed layer is in cohesive contact with previously formed layers, whereby the first-formed layer 30 of the honeycomb, formed as described in FIG. 3a, constitutes the bottom of the unitary honeycomb structure.

Where desired, the monolithic honeycomb structure made in accordance with the process of this invention may be formed on a substrate or support, but it should be understood that the substrate is not necessary to make the monolithic structure self-supporting. The substrate can be initially placed in lose spacial relationship with the exit side of the stencil, the distance between the substrate and stencil being substantially equivalent to the thickness of a lamina. As successive laminae are formed beneath the screen, the substrate descends so as to increase the distance between it and the stencil, thereby permitting successive laminae to be deposited in building a three-dimensional structure supported by the substrate. The substrate is thus in contact with only the initially formed lamina.

After forming the monolithic structure, it can be heated to a moderate temperature to remove at least a portion to substantially all of the vehicle. Usually the structure is heated to a higher temperature to sinter the particles and form a stronger structure which is resistant to high temperatures.

The manner of firing the structures formed by the process of this invention may be increasingly important as the thickness of the structure to be fired is increased, since the structure must retain its physical integrity through the heating cycle. Generally, this can be achieved by using a mixture of thermoplastic vehicles which includes lower and higher boiling ingredients and by subjecting the body to a gradual heating cycle to remove the thermoplastic vehicles. An important part of the firing cycle is the manner of removing the vehicle. If, for example, the structure is merely brought up quickly to a temperature at which the vehicle volatilizes, the structure may not retain its shape. The heating should thus be gradual. Generally, organic vehicles may be chosen which are completely removed when the structure is held at no higher temperature than about 350° C. for about 30 minutes. The rate at which the structure is brought to the desired maximum vehicle removal temperature may be determined not only by the choice of vehicles, but also by the physical characteristics of the inorganic powder in the vehicles. It has been found that the presence of a high surface area powder in the formulation tends to impart structural strength to the formed body while the vehicle is still present.

After the gradual heating cycle to remove the vehicle from the structure, it can be fired at a firing cycle which is determined by the sintering temperature of the particular material. Sintering temperatures are conventional. For example, ceramics generally require sintering temperatures of about 1,000° C. or higher; precious metals can be sintered to a high level of strength at about 400° to 500° C.

By reason of this invention, it is possible to achieve a honeycomb structure having, for instance, about 200–300 channels per cross-sectional square inch. A structure of this nature is particularly useful as a substrate for catalysts used in controlling the emissions from internal combustion engines such as shown in U.S. Pat. Nos. 3,441,381 and 3,565,830. Also, it is possible to produce by the methods of this invention, structures of various designs for many uses, e.g. electrical insulator structures with multiple openings or channels to serve as receptacles for electric plugs.

The compositions used to form the self-supporting structures in accordance with this invention consist essentially of a finely-divided solid, inorganic material and a temporary vehicle. The inorganic solid component of the formulations, or a residue thereof, remains in the structure even after it is sintered. The method of this invention can be used to produce a body of virtually any inorganic material such as glass, metal, metal oxide, minerals, or combinations thereof. The material of choice may depend on the end use intended, and the finely divided powder is usually sinterable to permit production of a structure that is relatively stable at temperatures above about 400° C., and preferably above about 1,000° C. The material may be present in the formulation as ceramic powders such as glass powders, metal powders, minerals in the form of a powder, and the like. The powders often have a particle size below about 44 microns, preferably about 20 to 40 microns. This component is often the major portion of the composition, preferably about 70 to 90 weight %, but the amount may be about 10 to 90%. The method can be used, for example, to produce structures of materials such as alumina, zirconia, aluminosilicates, quartz, zeolites, vanadia, copper chromite, tungsten, silver, ruthenium, and the like, and mixtures and combinations thereof.

The vehicles suitable for use in the formulations employed in this invention may be solid at room temperatures and fluid at elevated temperature, preferably at a moderately elevated temperature, e.g. about 50° to 130° C., preferably about 70°-110° C., which temperatures may be used when forcing the formulations through the stencil. Apart from their desirable temperature characteristics, the vehicles have a suitable viscosity at the elevated temperature, e.g. to enable the mixtures to remain as a homogeneous mass without undue separation of the solids. Moreover, the vehicles are relatively stable at the conditions the stencil is employed. Thus, thermoplastic vehicles should have characteristics that are reversible on repeated heating and cooling, without, for instance, gelling or polymerizing to any degree which would change their softening and freezing temperatures. Also, it is preferred that the vehicle, when removed from the formed structure, not leave any objectionable residue, such as carbon or chloride deposits which may not be desired in some instances. Vehicles of this type are well-known, and have been used commercially for many years to apply decorative coatings on glass, as described in U.S. Pat. No. 2,682,480, and precious metal coatings on glass or ceramic, as described in U.S. Pat. No. 3,092,504.

The thermoplastic vehicles are often mixtures of various waxes, resins, plasticizers and solvents, such as "Carbowax" 4000, "Abalyn", "Armeen" 18D stearamide, "Acryloid" SF 100, "Armid" HT, "Staybelite", stearic acid, limed wood rosin, paraffin wax, stearyl alcohol, carnauba wax, aluminum stearate, phosphorated tall oil, bayberry wax, natural vegetable wax, "Polypale" resin, lecithin, stearyl acid phosphate, various polyethylene glycols, diphenyl, various esters of hydrogenated rosin, polybutenes, asphalts, and various natural balsams. The terms appearing in quotes are trademarks described in "Handbook of Material Trade Names," by Zimmerman and Levine, 1953 Edition, Industrial Research Service, Dover, New Hampshire.

The formulations used in this invention can be made by, for instance, employing a wax as the vehicle. Such wax may be present in the initial formulation in the amount of about 20 percent to 80 percent by weight, depending on the particular wax used, the method of application and degree of hardness sought in the finished product. These compositions melt in the range of about 125° F. to 215° F. Examples of synthetic waxes are the Armids, which are primary amides of fatty acids. Armid HT, melting point 208° F., Armid C, M.P. 174° F., and Armid O, M.P. 144° F., have been found to be very suitable in thermoplastic formulations. Other waxes found to be useful are Rosin Amine D stearate, Rosin Amine D 2-ethyl hexoate, stearic acid and stearone.

Instead of a wax or wax-like substance, a thermoplastic resin can be used to make a thermoplastic formulation. An example of such thermoplastic resin is Staybelite Resin, a hydrogenated rosin described in the booklet, "Staybelite Resin," published by Hercules Powder Company in 1946. Thermoplastic resins may be present in the initial formulation in the amount of from about 20 percent to 90 percent by weight, giving printing formulations which melt at somewhat higher temperatures, such as about 200° to 240° F., than those made with waxes. Other thermoplastic resins found to be useful are Staybelite Ester No. 1, the ethylene glycol ester of hydrogenated rosin, Staybelite Ester No. 2, the diethylene glycol ester of hydrogenated rosin, the rosin Amine D salt of naphthenic acid, and an acrylic resin available commercially as Catalin Resin A-1114.

By using both a wax and a thermoplastic resin in varying proportions in the thermoplastic formulation, it is possible to vary the viscosity of the composition to suit different conditions or methods of application and to allow for variations in temperature. Suitable mixtures of thermoplastic resins and waxes are available commercially, such as "Drakotherm No. 712" and "Drakotherm No. 744," both melting at about 140° F. These compositions include a thermoplastic resin, a thermoplastic wax, a plasticizer, and a solvent, and leave no ash or residue on firing.

The range of total vehicle component in the initial formulations used in this invention can vary widely, for instance, from about 10 to 90 percent by weight of the formulation. When the product is to be fired after forming, the weight of vehicle in the initial composition is preferably a minor amount of the total formulation, e.g. from about 10 to 30% of the formulation weight. Larger amounts of vehicle are difficult to remove during firing without distorting the shape of the product. Cost of the vehicle is also a factor when the product is to be fired. When the vehicle is to be part of the finished product, almost any amount can be used and the optimum amount for a given application will depend on physical properties of solidified vehicles, e.g., plasticity, thermal conductivity, color, etc.

The choice of vehicle may be dictated in part by the material of construction of the stencil. The vehicle must have the desired fluidity at a temperature which would not damage the stencil. Since cost is a factor and inexpensive stencils of complex patterns can be made of organic compositions which cannot tolerate high temperatures, vehicles can be chosen which are solid at room temperature and have suitable fluidity at moderately elevated temperatures. Another desirable feature of the vehicles is that they dry and solidify substantially immediately on passing through the stencil, and as noted above, suitable thermoplastic materials soften and solidify reversibly on being subjected to repeated temperature cycles. The solidification is also referred to herein as freezing or setting.

Various additives to control the density, porosity, or physical form of the material of construction may be present in the formulations used in this invention. For example, nucleating agents may be added to glass powders, or fugitive materials such as carbon powder or graphite may be used as pore-formers with ceramic powders. The additives and techniques for using these additives are well known in the glass and ceramic art. It will be appreciated that equipment and conditions for carrying out the present invention can vary greatly, depending on the materials, the products, the end uses of the products, and the general state of technology in the field.

In a preferred embodiment of this invention, a colloidal, refractory, inorganic material is in the formulation. This material may have a particle size below about 1.0 micron, preferably below about 0.03 micron. The material may be present in a minor amount, e.g. up to about 10%, based on the weight of the total inorganic powder in the formulation, often at least about 0.1 or 0.5%. Large amounts of the colloidal powder may increase the viscosity of the formulation. Examples of suitable additives of this type are colloidal alumina or silica.

The invention will be further understood by reference to the illustrative examples given below. In the examples, the ceramic powder mixture was composed of the following materials by weight:
Nepheline syenite: 55
Ball clay: 15
Kaolin: 25
Silica: 5

The ceramic mixture is known and is similar to many compositions intended for firing at low to moderate sintering temperatures. As is known in the art, this ceramic component can be made fully dense or in a wide range of porous versions, by control of firing cycle and by the addition of pore-producing additives, such as carbon powder. The mixture of powders of the given components of the ceramic body is referred to below as the ceramic powder.

EXAMPLE 1

A hot melt thermoplastic formulation was made by passing the above ceramic powder mixture through a 100 mesh sieve. The powder was blended, at 90° C., with a thermoplastic vehicle consisting of stearic acid and stearone. Parts by weight were:

| Ceramic powder | 540 |
|---|---|
| Stearic acid | 100 |
| Stearone | 100 |
| | 740 |

The formulation was fluid enough for screen printing at 90° C. and froze, i.e. solidified, to a hard solid of slight waxy feel at about 70° C. It was printed through a stainless steel screen, 84×84 mesh, of wire having a diameter of 0.0039 inch. A 2×2 inch grid pattern in the form of ⅛ inch square islands separated by 1/16 inch lines, had been made in the screen.

Forming of the honeycomb was accomplished without use of a substrate, by maintaining the thermoplastic formulation at about 90° C. in the stencil and forcing controlled amounts through the grid pattern by use of a rubber squeegee. By "controlled amounts" is meant that on each stroke of the squeegee, the same amount of formulation is forced through the stencil to form a layer of uniform thickness beneath the stencil. The stencil was horizontal, and as successive lamina emerged from the bottom of the screen, they froze almost immediately to replicate the grid pattern. Using hundreds of successive strokes, a three-dimensional honeycomb structure was formed in about 10 minutes. This structure was about 2 inches high and had a uniform grid pattern of 1/16 inch walls enclosing ⅛ inch open squares forming channels from top to bottom. A structure such as this is useful in cryogenic insulation, since the materials of the walls have low thermal conductivity and the open air space in the channels limits convective transfer of heat.

EXAMPLE 2

A hot melt formulation similar to that of Example 1, was made in the following parts by weight:

| Ceramic Powder | 525 |
|---|---|
| Colloidal alumina | 15 |
| Stearic acid | 100 |
| Stearone | 100 |
| | 740 |

Colloidal alumina is used because its very fine particle size aids sintering of the ceramic powder. Using the screen with the 2×2 inch grid pattern described in Example 1, this formulation was printed onto a flat Teflon sheet. More than 100 strokes of the squeegee were used to give a three-dimensional structure having a height of about ¼ inch. The Teflon sheet was lowered in relation to the stencil after each stroke to permit this three-dimensional build-up.

The honeycomb structure was removed from the Teflon sheet and placed on a flat refractory support in an electrically heated kiln. Heating was gradual to prevent loss of detail of the structure while the vehicle was in the fluid range. This was achieved by heating at a constant rate to 250° C. in four hours. The kiln was held at 250° C. for one hour and at the end of this hold, the evolution of heavy, white vapors had ceased. Heating was continued, gradually to 350° C. in one hour to remove residual organics, and then was continued rapidly to 1150° C. This final step took about 6 hours. On cooling overnight, a dense three-dimensional ceramic structure, resembling a honeycomb, resulted. This structure was about 3/16 inch high and 1½ by 1½ inches square, and had a grid pattern of square channels separated by walls about 40 mils thick. Unitary ceramic structures of this type are useful as catalyst supports.

EXAMPLE 3

Ceramic honeycomb structures having smaller channels and thinner walls were made from the following hot melt printing formulations:

| Ceramic powder | 525 |
|---|---|
| Colloidal alumina | 15 |
| Stearic acid | 180 |
| Gilsonite | 20 |
| | 740 |

Gilsonite is a naturally-occurring asphaltite. The type used is that obtained from the American Gilsonite Company and it is essentially free of inorganic impurities, analyzing 99.9% organic. It is soluble in molten stearic acid and does not separate from solution on cooling to room temperature.

In this formulation, the ceramic powder was passed through a 270 mesh sieve to permit printing through a screen having a finer mesh than that described in Example 1. The powder was stirred into the molten vehicle at about 100° C. to give a formulation which printed well in the range of 80° to 110° C.

The screen was made of stainless steel, 150×150 mesh, of wire diameter 0.0026 inch. This screen was stretched on a wooden frame and a 4×4 inch grid pattern of 1/16 inch squares separated by 1/32 inch lines was formed in the screen. The formulation was heated in the screen with infrared bulbs and was forced through the pattern with a rubber squeegee. No substrate was used, and the printing formulation set as a layer almost immediately on passing through the stencil to form a hard self-supporting structure. A number of these structures were made using several hundred layers in each case to build up the three-dimensional structures.

When fired on the following cycle, these structures gave completely dense honeycomb structures of high strength. The first part of the firing cycle was very gradual, taking eight hours to reach 250° C. at a constant rate of rise. Firing was in an electrically heated kiln open to the air. At 250° C. there was substantial evolution of white vapors and after one hour at this temperature, these vapors ceased. The structure then had a dark color attributed to gilsonite. This color changed to that of the ceramic powder after reaching 350° C. in one hour and holding at this temperature for one hour. Firing was then continued to 1150° C. with about 6 hours needed for the kiln to reach this temperature. Honeycomb structures made on this cycle were essentially pore-free. They were about $3\frac{1}{8} \times 3\frac{1}{2}$ inches square and about $\frac{1}{2}$ inch in height. The channels were uniform and were squares about 40 mils on a side, separated from one another by ceramic walls about 20 mils thick. Dense ceramic honeycomb structures of this type can be used in chemical reactors. In certain applications, the structures are further coated, e.g. with a precious metal for use in chemical reactors.

As stated hereinbefore, the inorganic powder employed in this invention is capable of being sintered to a condition of mechanical strength sufficient to be self-supporting, even when used under high temperature conditions. For example, in ceramic bodies, maximum strength is achieved when sintered to full theoretical density. In some uses for monolithic structures, according to the present invention, maximum strength is necessary. This is the case for a platinum getter which is a ceramic honeycomb structure coated on all surfaces with a layer of gold $\frac{1}{2}$ micron thick and used in association with nitric acid reactors. The gold scavenges the platinum from the vapor phase and converts it to a non-volatile, platinum-gold alloy. In such case, the non-superficial surface area of the monolithic ceramic support is not important, but mechanical strength in the structure is necessary to resist vibrations associated with the nitric acid reactor with which the platinum getter is employed. Examples of materials that may be sintered to full theoretical density are housebrick and fully dense porcelain such as used for spark plugs and china. An example of materials which may be sintered to less than full theoretical density is a porous ceramic used as a catalyst support, e.g. alumina, where large non-superficial surface area is required and only reasonable or moderate strength is necessary.

Structures made in the same way as described in Example 3 were fired to a lower peak temperature to give porous, three-dimensional structures, useful for catalyst supports. This firing was carried out in a production size, gas-fired kiln and the cycle was controlled automatically by the travel of a cam. The first critical part of the cycle is below 400° C. when the organic vehicle must be removed gradually to prevent movement of the honeycomb structure. The other critical part is the approach to peak temperature, since this controls the sintering rate, and thus the porosity, of the final structure. In this firing, the temperature was raised gradually over seven hours from ambient to 278° C. After a 30 minute dwell at this temperature, heating was resumed to 400° C. at the same rate. Heating was then continued at a rate determined by the design of the kiln until Orton pyrometric Cone 03 was observed to touch. Observation was continued until Cone 02 touched, when fuel was turned off. Cone 02 is a nominal temperature of 1135° C.

After cooling, three-dimensional, porous honeycomb structures resulted. These were, in size, slightly less than $3\frac{1}{2} \times 3\frac{1}{3}$ inches and about $\frac{3}{4}$ inch in height. The honecombs produced on this cycle were highly porous, had 169 channels per square inch and had good mechanical strength as well. Porous unitary structures of this type are also useful as regenerative heat exchangers.

What is claimed is:

1. A process for making a monolithic structure having a plurality of channels comprising:
   (a) admixing an inorganic powder and a temporary vehicle to provide an admixture which is solid and self-supporting at room temperature and is fluid at an elevated temperature, said inorganic powder being capable of being sintered;
   (b) depositing the admixture on a stencil having a plurality of masking islands;
   (c) providing the admixture deposited on said stencil in a heated fluid condition;
   (d) forcing the resulting heated, fluidized admixture through said stencil, thereby forming a thin lamina beneath and in contact with the bottom of said stencil, and immediately cooling said lamina by loss of heat to the ambient surroundings to form a reproduction of said stencil such that said masking islands define openings in said lamina;
   (e) repeating step (d) at least about 20 times in a manner such that each lamina is formed on the top surface of the lamina previously formed so as to produce successive, overlying, cohesive laminae forming a substantially monolithic structure having a plurality of channels formed therethrough, said channels having a cross-sectional area defined by said openings provided by said masking islands, said successive, overlying, cohesive laminae being formed as a continuous structure of at least about $\frac{1}{4}$ inch in length;
   (f) heating gradually the monolithic structure to remove said vehicle and to prevent distortion of the monolithic structure; and
   (g) thereafter heating said monolithic structure to a sintering temperature, and then permitting the monolithic structure to cool, said structure exhibiting a condition of mechanical strength sufficient to be self-supporting.

2. A process for making a monolithic honeycomb structure comprising:
   (a) admixing an inorganic powder and a temporary thermoplastic organic vehicle to provide an admixture which is solid and self-supporting at room temperature and is fluid at an elevated temperature, said inorganic powder being capable of being sintered;
   (b) depositing the admixture on the upper surface of horizontal stencil having a plurality of masking islands;

(c) providing the admixture deposited on said stencil in a heated fluid condition;

(d) forcing the resulting heated, fluidized admixture through said stencil, thereby forming a thin lamina beneath and in contact with the base of said stencil and immediately cooling said lamina by loss of heat to the ambient surroundings to solidify said lamina and form a reproduction of said stencil in contact with the base of said stencil, said reproduction of said stencil being such that said masking islands define openings in said lamina;

(e) repeating step (d) at least about 20 times in a manner such that each lamina is formed on the top surface of the lamina previously formed so as to produce successive, overlying cohesive laminae forming a substantially monolithic honeycomb structure, said honeycomb structure having a plurality of channels formed therethrough, said channels having a cross-sectional area defined by said openings provided by said masking islands, said successive, overlying, cohesive laminae being formed as a continuous structure which is at least about ¼ inch in length;

(f) heating gradually the monolithic honeycomb structure to remove said vehicle and to prevent distortion of the monolithic honeycomb structure; and (g) thereafter heating said monolithic honeycomb structure to a sintering temperature and then permitting the monolithic honeycomb structure to cool, said honeycomb structure exhibiting a condition of mechanical strength sufficient to be self-supporting.

3. The process of claim 2 wherein said vehicle comprises a wax or wax-like substance.

4. The process of claim 2 wherein said vehicle comprises stearic acid.

5. A process of claim 2 wherein said masking islands are substantially symmetrically arranged.

6. A process of claim 5 wherein said masking islands are substantially uniformly spaced relative to each other.

7. A process of claim 2 wherein said inorganic powder is selected from the group consisting of alumina, zirconia, aluminosilicates, tungsten, silver, ruthenium and mixtures and combinations thereof.

8. The process of claim 2 wherein the resultant structure has more than about 100 channels per square inch of cross-section.

9. The process of claim 2 wherein during step (e) the bottom of the first-formed lamina comes into contact with a horizontal substrate below said stencil and originally spaced therefrom, and said substrate is lowered in relation to said stencil after each deposition of a lamina.

10. The process of claim 2 wherein during step (e) the initially formed lamina exiting the base of said stencil is deposited on a horizontal substrate located below the base of said stencil and originally spaced therefrom, and the substrate is lowered in relation to said stencil after each deposition of a lamina, and said substrate is subsequently removed from the resulting honeycomb structure before step (f).

* * * * *